United States Patent [19]

Brooks et al.

[11] 4,171,243

[45] Oct. 16, 1979

[54] SPRAY DRYING METHOD

[75] Inventors: Burton Brooks, Bellevue; Richard J. Brooks, Seattle, both of Wash.

[73] Assignee: The Chemithon Corporation, Seattle, Wash.

[21] Appl. No.: 859,943

[22] Filed: Dec. 12, 1977

Related U.S. Application Data

[60] Continuation-in-part of Ser. No. 587,700, Jun. 17, 1975, which is a division of Ser. No. 393,192, Aug. 30, 1973, abandoned.

[51] Int. Cl.$^2$ .............................................. B01D 1/16
[52] U.S. Cl. ........................... 159/48 R; 159/4 CC; 159/4 GC; 159/4 A; 159/DIG. 26; 55/122; 55/126; 55/22 D
[58] Field of Search ............... 159/4 CC, 4 GC, 4 R, 159/4 A, DIG. 26, 48 R, 16 R, 16 A, 48 R; 55/107, 122, 126, 135, 134

[56] References Cited

U.S. PATENT DOCUMENTS

| | | | |
|---|---|---|---|
| 1,329,737 | 2/1920 | Wolcott | 159/DIG. 26 |
| 1,329,818 | 2/1920 | Wolcott | 55/122 |
| 1,333,457 | 3/1920 | Sippel et al. | 159/4 GC |
| 1,491,026 | 4/1924 | Brindle | 159/4 A |
| 1,817,349 | 8/1931 | Clark | 159/4 CC |
| 2,635,684 | 4/1953 | Joscelyne | 159/4 GC |

Primary Examiner—Norman Yudkoff
Attorney, Agent, or Firm—Merriam, Marshall & Bicknell

[57] ABSTRACT

A method for spray drying an aqueous slurry in a spray drying tower. Hot effluent gases containing steam are divided into two portions. One portion is heated and recycled to the spray drying tower as part of the heated gas stream which dries the slurry. The other portion is condensed and subjected to a contaminant-removal operation such as scrubbing or electrostatic precipitation, under controlled conditions.

24 Claims, 2 Drawing Figures

SPRAY DRYING METHOD

RELATED APPLICATIONS

This is a continuation-in-part of application Ser. No. 587,700, filed June 17, 1975, entitled "Gas Scrubbing Method and Apparatus", in turn a division of application Ser. No. 393,192, filed Aug. 30, 1973, and now abandoned. The disclosures of these antecedent applications are incorporated herein by reference.

BACKGROUND OF THE INVENTION

The present invention relates generally to spray drying methods, and more particularly to one in which the effluent gases from the spray drying method are to be subjected to a particulate removal operation downstream of the spray dryer, as by scrubbing or electrostatic precipitation.

Generally, in conventional spray drying methods, a solids-containing, aqueous, liquid slurry is introduced into the top of a spray drying tower while a heated gas stream is introduced into the bottom of the tower. The descending slurry is dried by the rising, heated gas stream. Dried, solid particles from the slurry are removed in powdery form from the bottom of the spray drying tower, and effluent gases are removed from the top of the spray drying tower.

A typical, conventional spray drying method is disclosed in Hall U.S. Pat. No. 1,985,987 entitled "Art of Spray Drying Soap". As noted in Hall (Column 2, lines 30–38), the effluent gases removed from the top of a spray drying tower includes, as contaminants, particles of the very same powder as is removed from the bottom of the spray drying tower. Because of the presence of these and other contaminants in the effluent gases from the spray drying tower, the effluent gases cannot be discharged into the atmosphere without impermissible pollution of the atmosphere, so that the contaminated effluent gases must be treated downstream of the spray drying tower to remove the contaminants, e.g., by scrubbing or electrostatic precipitation, or both. These are common processes for removing solid particulates and fumes from gases.

It is well known in the art of removing contaminants from gases that the contaminants in the gas vary with the particular industrial process from which the gas originates. Similarly, the scrubbing liquid utilized depends upon the particular contaminants in the gas. To remove solid particulates, water is the conventional scrubbing liquid. When the gases contain fumes which are acidic, an alkaline solution is conventionally utilized as part of the scrubbing liquid. Similarly, when the gases are contaminated with alkaline fumes, an acidic solution is utilized in the scrubbing liquid. This is evidenced by the following prior art patents:

Hausberg U.S. Pat. No. 3,140,163 (Water is the usual scrubbing liquid for removing solid particles from gas—Column 1, lines 14–17);

Moser U.S. Pat. No. 1,128,177 (Water is used to remove solid impurities from smoke—Page 1, column 1, lines 8–21, page 2, column 2, lines 67–83);

Mare U.S. Pat. No. 3,626,667 (Water is conventionally used as scrubbing liquor in a scrubber to remove solid particles from gas—Column 1, lines 34–51); and Heitz U.S. Pat. No. 2,747,962 (Water or alkaline solution are customarily used to remove acidic gases from gas mixtures—Column 1, lines 15–25).

SUMMARY OF THE INVENTION

Essentially, the present invention is a method of spray drying material with a spray drying tower communicating with a scrubber or electrostatic precipitator (or both in series), wherein the tower receives (1) a solids-containing, aqueous, liquid slurry (e.g., detergent slurry) and (2) a heated gas stream containing steam for drying the solids contained in the slurry. Typically, the slurry is introduced at the top of the tower and descends, and the heated gas stream is introduced near the bottom and rises in the tower.

In accordance with this method, hot effluent gases containing steam are discharged from the top of the spray drying tower and divided into first and second hot gas portions. The first portion of hot effluent gases is heated to a temperature further above the dew point thereof (and above the temperature of the solids-containing, aqueous, liquid slurry received in the spray tower). This heating step superheats the steam in the hot effluent gases.

Following the heating step, the first portion is recycled to the spray drying tower. In the spray drying tower, the recycled, heated gases contact the solids-containing, aqueous, liquid slurry and dry the latter. Thus, in effect, the slurry is being dried with superheated steam, steam being a principal constituent of the recycled, heated gases previously discharged from the top of the spray dryer.

The second portion of the hot gases discharged from the top of the spray dryer is subjected to a condensing step, following its division from the recycled first portion. In the condensing step, the hot effluent gases are cooled, and solid particulates and vaporous contaminants which have condensed are agglomerated into larger sized particles or droplets. The larger particles resulting from the condensing step are more susceptible to removal from the gases of said second portion when the gases are subjected to a contaminant-removal operation, e.g., as by scrubbing or in an entrainment separation step. In addition, the temperature of the effluent gases is reduced by the condensing step.

There is thus provided an arrangement in which gases discharged from the top of the spray tower are reheated and recycled back into the spray tower, to absorb more moisture, together with the step of withdrawing part of the discharged gases from the recycle loop, for subjection to a condensing step. Because of this arrangement utilizing the recycle loop, the gas portion subjected to the condensing step has a greater moisture content than it would have had if the gas had not been withdrawn from a recycle loop, and this increases the agglomerating effect on the contaminants in the gas undergoing condensing.

In addition, recycling a portion of the effluent gases from the spray drying tower reduces the oxygen content in the ascending gases within the tower, and this permits the tower to operate at a higher drying temperature without burning the product undergoing drying; and a higher drying temperature increases the capacity and productivity of the tower. Recycling also conserves for reuse the sensible heat of the recycled gas portion.

Following the condensing step, the second portion of discharged gases is subjected to a particle removal operation, such as scrubbing or electrostatic precipitation, without increasing the temperature of the second portion of discharged gases above that to which the second portion was cooled by the condensing step. Because only a portion (e.g., 40-60%) of the effluent gases from the spray drying tower are subjected to particle removal in a scrubber or electrostatic precipitator, these devices may be of a much smaller capacity than would be the case if all the effluent gases were subjected to a particle removal operation without previous recycling.

In the embodiment in which an electrostatic precipitator is used as the particle removal device, the condensing step is used as part of a preliminary removal operation for the larger particles and droplets agglomerating in the condensing zone. As an alternative, the electrostatic precipitator may be preceded by a scrubber which, like the condensing zone, cools the effluent gases and agglomerates solid particulates and vaporous contaminants into larger sized particles or droplets which are then removed from the effluent gases before they enter the electrostatic precipitator.

When an electrostatic precipitator is used, the cooling or condensing step, conducted prior to electrostatic precipitation, should be controlled to lower the temperature of the gas below the dew point of any vaporous component which, at that time, is present in the gas in sufficient quantity to have a visible pollutant effect. Conducting such a cooling step prior to electrostatic precipitation causes a decrease in the amount of pollutants remaining in the gas leaving the precipitator whereas failure to cool to a temperature sufficiently low can result in gas leaving the precipitator with virtually the same amount of pollutants as was in the gas entering the precipitator.

Other features and advantages are inherent in the method claimed and disclosed or will become apparent to those skilled in the art from the following detailed description in conjunction with the accompanying diagrammatic drawing.

DETAILED DESCRIPTION

Figure 1:
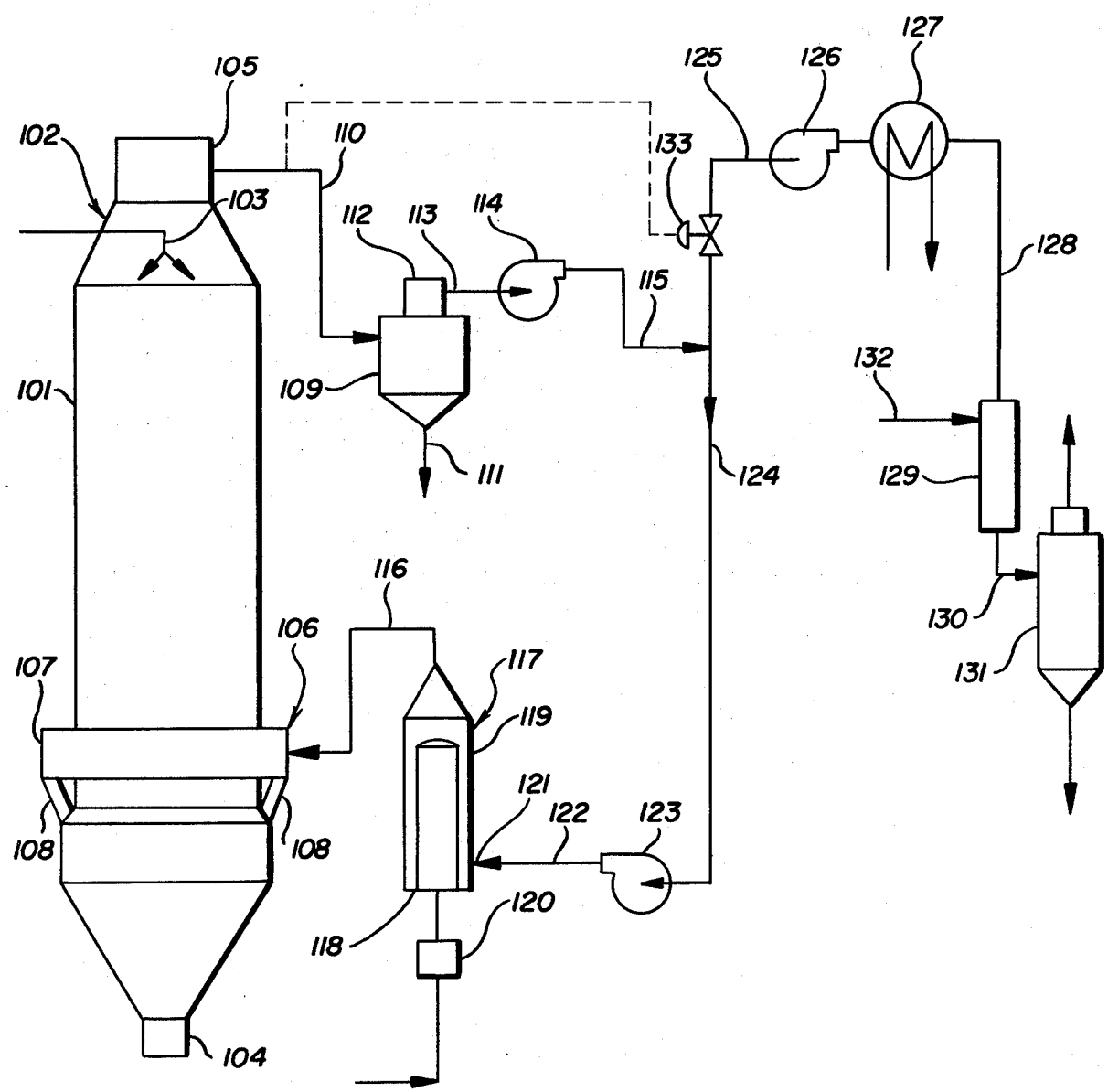
FIG. 1 is a schematic of a process employing spray drying and scrubbing in accordance with an embodiment of the present invention.

As shown in FIG. 1, a spray-drying system in accordance with an embodiment of the present invention comprises a spray tower 101 near the top of which is located a conventional slurry or solution inlet 102, which may include a spray inlet 103 as shown or may take any other suitable form.

The tower 101 has a dried-material outlet 104 at its lower end, an effluent gas outlet 105 at its upper end, and a drying gas inlet, indicated generally at 106, in the lower region of the tower. Gas inlet 106 comprises a tuyere manifold 107 with multiple tuyeres or inlet conduits 108, but other forms of drying-gas inlets may be employed.

Gas outlet 105 communicates with a primary gas-solids separator, such as one or more cyclones 109, via a line 110. The solids outlet 111 of the cyclone communicates with any desired point, whether it be a waste-storage area or a product-storage area.

The cyclone gas outlet 112 communicates via a line 113 with a fan 114.

The tuyere manifold 107 receives drying gas via a line 116 from a gas or air heater indicated generally at 117. In FIG. 1, heater 117 is shown as an indirect heater including a combustion chamber 118 surrounded by an air of drying gas chamber 119 which communicates with the line 116. However, the use of a conventional direct heater is permissible. Combustion air and a suitable fuel are supplied to combustion chamber 118 via a burner 120. When using combustion-type heaters, indirect heating avoids dilution or contamination of the drying air or gas with products of combustion.

Drying-gas chamber 119 has an inlet 121 which receives gas via a line 122 from a fan 123. In turn, fan 123 receives drying air or gas from a branch line 124 of a discharge line 115 of fan 114 which, in turn, receives the gas from outlet 105 of tower 101.

A second branch line 125 of discharge line 115 serves an exhaust fan 126 supplying a condenser or heat exchanger 127. The condenser 127 supplies cooled gas via a line 128 directly to a scrubber 129 which discharges the scrubbed gas to the atmosphere via a line 130 and a cyclone separator 131.

The scrubber 129 receives a suitable scrubbing solution, conventionally water, from a source 132, and the solution is recovered at cyclone 131 for eventual reuse in scrubber 129 or for discard, according to the requirements of the particular process. When reused at scrubber 129, the liquid recovered at cyclone 131 and recycled to the scrubber may first undergo processing to separate the pollutants entrapped therein, and the recycled liquid may then be cooled in a heat exchanger, for example, before reintroduction into the scrubber. Cooling of the recycled scrubbing solution is essential when the scrubber performs both the condensing and particle removal steps.

The balance or proportioning of flow between the spray tower's recycle fan 123 and exhaust/scrubber fan 126 is regulated by a valve 133. The valve 133 may be a simple, manual valve or, preferably, is a pressure-responsive valve, as shown. A pressure line 134 senses the pressure in tower 101 or upstream of cyclone 109, such as in line 110, to control regulating valve 133. This may be accomplished either by forming line 134 as a pressure-transfer line serving, for example, a diaphragm in the valve 133, or by employing electrical controls which are sensitive to the tower pressure.

The operation of the spray-drying system is typical in its fundamentals. The hot drying gas rises in tower 101 from the level of tuyere manifold 107 to exit at outlet 105 as part of the effluent gases. Slurry or solution enters through spray inlet 103 and is dried by the rising gas as the slurry descends through the tower. Dried solids exit through the outlet 104.

The water or moisture, originally introduced via inlet 103 as part of the slurry, is vaporized or evaporated to steam by the rising hot gases in tower 101 and is carried out as part of the effluent gases, through outlet 105. Also carried out through top outlet 105, as part of the effluent gases, are some particles of the same dried solids as exit through bottom outlet 104. The effluent gases, which are well above their dew point, then pass through cyclone 109 and fan 114. A significant portion of the effluent gases is recycled, still above the dew point, to inlet 121 of heater 117, for reheating and reuse in tower 101.

An example of a spray drying method in accordance with the present invention and utilizing direct heating is set forth below.

A spray tower 12½ feet in diameter and with an overall height of about 90 feet is supplied with about 2,000 cfm of direct combustion air. Detergent slurry at the rate of 4,300 lbs. per hour is introduced via spray inlet 103, while dried detergent solids are discharged at bottom outlet 104. The slurry includes 3,000 lbs./hour of solids, on a dry basis, and 1,300 lbs./hour of water.

The gases supplied to tuyere manifold 107 of the spray tower are introduced into the tower at about 600° F. and discharged from the top of the tower at about 300° F. The portion of effluent gases recycled to air heater 117 is received at the heater at about 240° F., still substantially above the dew point.

The effluent gases discharged from the top of the tower can be contaminated with particles of the same detergent solids as are discharged at the bottom outlet of the tower, as well as vaporous contaminants (such as unreacted organic reactant vapor) from the detergent manufacturing operation upstream of the spray drying operation. The detergent manufacturing operation is typically a conventional process involving sulfonation, neutralization, etc., as described in Brooks et al. U.S. Pat. No. 3,427,342, and the disclosure thereof is incorporated herein by reference.

The portion of effluent gases not recycled via line 124 is cooled at condenser 127 to agglomerate solid particulates and vaporous contaminants. The cooled effluent gases from condenser 127 are then passed directly to scrubber 129 where solid and liquid particles are scrubbed from the gases by the scrubbing solution. The scrubbing solution, with the contaminants entrained therein, is separated from the scrubbed gases in cyclone separator 131 from which the separated gases pass to the atmosphere.

The obscurity or plume density of the gases entering scrubber 129 ranged between 40 and 50%, while the treated gases leaving separator 131 were reduced in obscurity to a level of between 5 and 10%.

Figure 2:
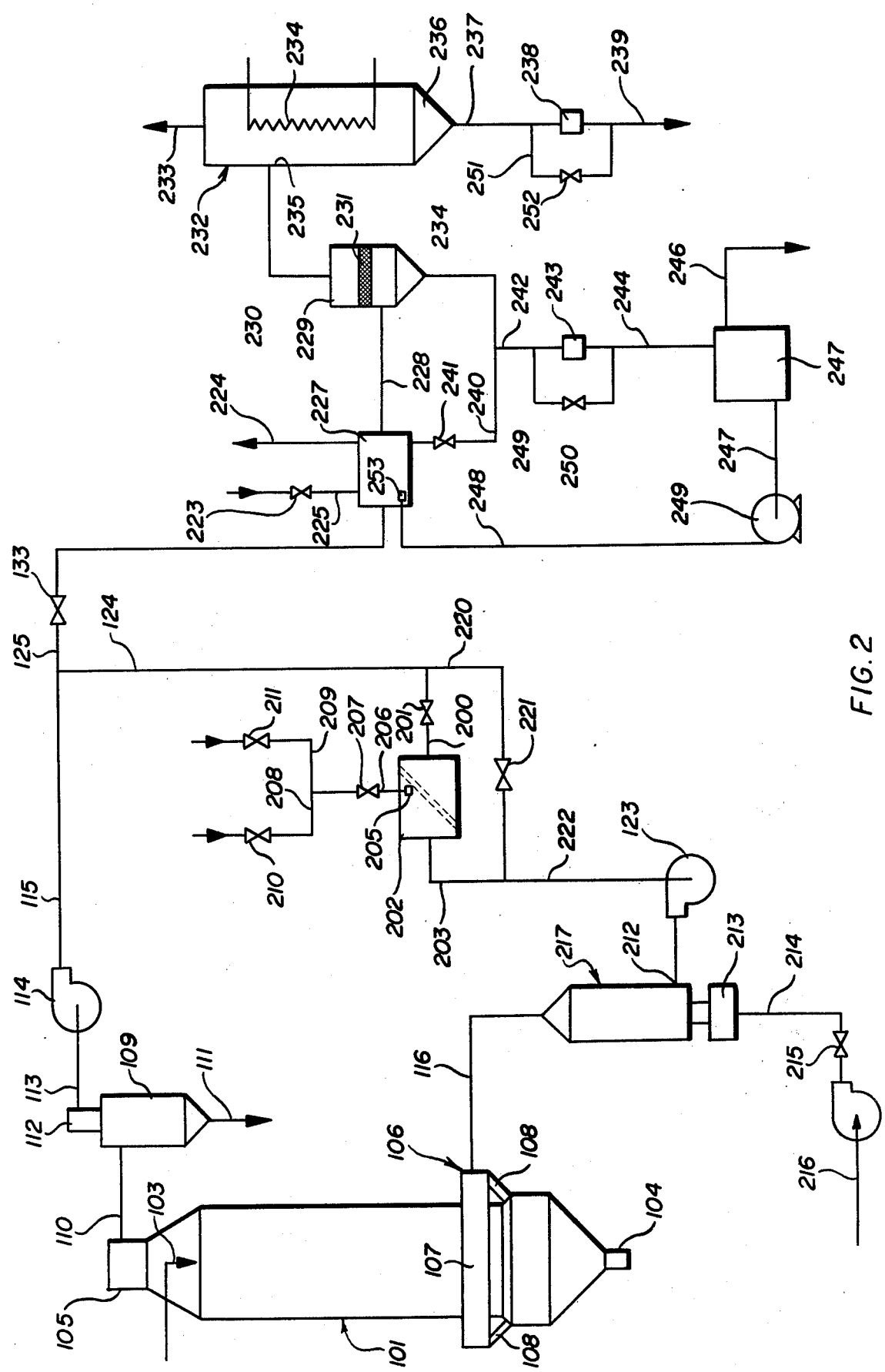
FIG. 2 is a schematic of an embodiment of the present invention employing electrostatic precipitation in conjunction with the spray drying.

Following is a description of the embodiment of FIG. 2. As in the embodiment of FIG. 1, spray tower 101 has a gas outlet 105 communicating, via line 110 with cyclone separator 109 having a solids outlet 111 and a gas outlet 112 communicating via line 113 with a blower 114 having a discharge line 115 communicating with a first or recycle branch line 124 and a second branch line 125.

Recycle branch line 124 communicates, via an inlet line 200 and valve 201, with a dust-filtering zone 202 having an outlet line 203. Line 203 communicates with a blower inlet line 222 communicating with recycle blower 123 having outlet line 122 communicating with the inlet 212 of a heater 217 which, for purposes of illustration, is shown in FIG. 2 as a direct heater. Heater 217 is heated by combustion gases from a burner 213 communicating via a line 214 and valve 215 with a blower 216 for combustion air.

Blower inlet line 222 also communicates with a bypass line 220 having a valve 221 and bypassing dust-filtering zone 202. The latter includes a filter element 204 for filtering dust from gases directed through filtering zone 202. The filter element is sprayed from a nozzle 205 at the downstream end of a line 206 having a valve 207. Line 206 communicates, at its upstream end, with first and second branch lines 208, 209. Branch line 208 has a valve 210 and communicates with a water supply while branch line 209 has a valve 211 and communicates with a steam supply. Valves 210 and 211 can be regulated to adjust the temperature or characteristics of the fluid sprayed through nozzle 205.

Second branch line 125 conducts gas, withdrawn from the spray dryer's recycle loop, to a condenser 227. The proportioning of hot effluent gases through first and second branch lines 124, 125 may be controlled by valve 133 on second branch line 125.

Condenser 227 is preferably a finned tube cooler of conventional construction. Cooling water enters condenser 227 through an inlet line 225 having a valve 223, and heated water leaves condenser 227 through a line 224.

Hot effluent gases entering condenser 227 are cooled as they move therethrough and leave through a line 228 communicating with an entrainment separator 229 having a wire mesh trap 231 and communicating with a gas outlet line 230 leading into an electrostatic precipitator 232 having a gas exhaust line 233.

Hot effluent gases entering condenser 227 are cooled to a temperature below the dew point of the vaporous constituents of the effluent gases. These vaporous constituents include water (steam) and, in the case of effluent gases from a spray drying tower in which the slurry undergoing drying was a detergent slurry, organic vapors. These organic vapors comprise unreacted organic reactants left over from the detergent manufacturing process, upstream of spray drying tower 101. A description of such organic reactants is contained in Brooks et al. U.S. Pat. No. 3,427,342 at Cols. 6-7, and said description is incorporated herein by reference. The vapors may also include non-ionic detergent ingredients introduced near the end of the detergent manufacturing operation (e.g., at the spray drying crutcher), some of which is evaporated at the spray drying tower.

In addition, in embodiments of spray drying in accordance with the present invention, the conditions in the spray drying tower are such as to produce oxidation or breakdown products of the aforementioned unreacted organic reactants. As a result, the vaporous constituents of the effluent gases entering condenser 227 comprise steam, the unreacted organic reactants and non-ionic ingredients described above and oxidation products and breakdown products of said unreacted organic reactants.

The oxidation and breakdown products have a dew point lower than that of the unreacted organic reactant from which these products originate (and lower than the dew point of steam). Pursuant to the present invention, it is important that, prior to the electrostatic precipitation step at 232, the effluent gases be cooled below the dew point of these products. Accordingly, the temperature conditions at condenser 227 are controlled to cool the effluent gases to a temperature below the dew point of the aforementioned products, and this usually requires a temperature below 130° F. and preferably below 120° F. for the effluent gases leaving condenser 227, a temperature in the range 100°-110° F. being a typical operating temperature.

The cooling which occurs at condenser 227 condenses the vaporous constituents of the hot effluent gases and agglomerates some of the condensed vaporous constituents and some of the solid particulates (dust) in the effluent gases. The desired agglomeration is provided by an increased moisture content in the gases resulting from the partial recycling operation. The moisture content of the gases is greater than 20%, by volume, and typically 25-30%. As a practical matter, no more than 35% moisture is usually attainable when the recycled portion of the gases is reheated by direct heating. Some of the agglomerated solid and liquid particles settle on the cooling elements (coils and fins) within the condenser. This reduces the cooling ability of the condenser. Therefore, the condenser is provided with a spray nozzle 253 for spraying the condenser's cooling elements with clean wash water to wash the agglomerated particles from the cooling elements.

The dirty wash water with contaminant particles entrained therein, is removed from condenser 227 through a line 240 having a valve 241 and communicating with a line 242 leading into a condensate trap 243 for removing oily liquid from the wash water. Another line 244 leads from trap 243 to a tank 245 for storing wash water. Wash water is pumped from tank 245 through a line 247 by a pump 249 communicating via a line 248 with condenser spray nozzle 253.

Storage tank 245 also communicates with a line 246 leading to a drain. Inlet line 244 to tank 245 also communicates with a bypass line having a valve 250 and bypassing trap 243. The bypass line is for use during maintenance work on condensate trap 243.

Entrainment separator 231 has a bottom communicating with a liquid drain line 234 communicating with wash water line 242. Any liquid which accumulates in separator 229 is drained away through line 234. The function of the entrainment separator is to separate, from the effluent gases, any large particles of liquid which remain entrained in the effluent gases leaving condenser 227.

Those particles of liquid which remain entrained in the effluent gases leaving separator 229 are removed in electrostatic precipitator 232.

In the embodiment illustrated in FIG. 2 and described above, the apparatus for cooling the effluent gases to a temperature below the dew point of the vaporous constituents thereof is shown and described as a finned tube condenser and the entrainment separator is of the type utilizing a wire mesh trap. In an alternative embodiment, a scrubber may be substituted for the condenser as a cooling or condensing zone and a cyclone separator may be substituted for the wire mesh trap as an entrainment separator.

The important consideration in this alternative embodiment, as in the embodiment illustrated in FIG. 2, is that before entering the electrostatic precipitator, the effluent gases be cooled to a temperature below the dew point of the oxidation and breakdown products of the unreacted organic reactants from the detergent sulfonation process, these being vaporous constituents of the effluent gases leaving the spray dryer.

Electrostatic precipitator 232 is of conventional construction and may comprise a wire electrical element vertically disposed at 234 along the axis of a metal tube 235 constituting the other electrical element of the precipitator. Liquid (oil) is precipitated along the inner surface of tube 235 and drains downwardly to the bottom 236 of precipitator 232 from which the liquid is withdrawn through a line 237 communicating with a condensate trap 238 communicating with a line 239. A line 251 having a valve 252 bypasses condensate trap 238. Bypass line 251 is for use during maintenance work on condensate trap 238.

Following is an example of a typical operation involving spray drying and the removal of contaminants utilizing an embodiment of the present invention in accordance with FIG. 2. The solid contaminants, comprising particles of the same dried detergent solids as exits through the bottom outlet 104 of spray tower 101, will be referred to as "dust"; and the liquid or vaporous contaminants, comprising unreacted organic reactants from the detergent sulfonation process as well as oxidation and reaction products of said organic reactants, resulting from a spray drying step in accordance with the present invention, and any other liquid ingredients added to or present at the spray drier and which are at least partially volatilized there, will be referred to collectively as "oil."

The detergent slurry introduced into spray tower 101 at 103 comprises 6,200 lbs. per hour of water and 25 lbs. per hour of oil. The slurry also includes about 14,300 lbs. per hour of detergent solids on a dried basis. About 16,000 cubic feet per minute (SCFM) of hot effluent gases pass through line 115, and these gases contain 50,400 lbs. per hour of air, 13,400 lbs. per hour of water (steam), 15 lbs. per hour of detergent dust and 25 lbs. per hour of oil. At this point, the effluent gases have a temperature of about 215° F., a temperature above the dew point of the water and oil.

The effluent gases are split in half and about 8,000 SCFM of gas are recycled back to the spray tower, as the first or recycled portion of the hot effluent gases, through branch line 124, etc. With respect to this recycled portion, about 5 to 7 lbs. per hour of dust are removed at filter 202. Downstream of filter 202, in line 222, the gas comprises 25,200 lbs. per hour of air, 6,700 lbs. per hour of water vapor, 12.5 lbs. per hour of oil and 0–2 lbs. per hour of detergent dust.

In the recycle loop, about 5,800 SCFM of air are introduced through line 124 into burner 213 of heater 217. This air comprises 25,200 lbs. per hour of dry air and 500 lbs. per hour of water vapor.

The recycled effluent gases enter heater 217 through line 122 at a temperature of about 215° F. and leave the heater at a temperature up to 1000° F., e.g., 750° F. Most of the oil and some of the dust entering heater 217 are consumed there. Only traces of dust leave heater 217. Drying gas enters spray tower 101 at inlet section 106 at a rate of 13,800 SCFM and comprise 50,400 lbs. per hour of air and 7,200 lbs. per hour of superheated steam. No significant quantities of oil or dust are introduced at inlet section 106 with the drying gas.

About 8,000 SCFM of hot effluent gases at 215° F. are withdrawn from the recycle loop at line 125, as the second portion of hot effluent gases. This second portion comprises 25,200 lbs. per hour of air, 6,700 lbs. per hour of water vapor, about 7.5 lbs. per hour of detergent dust and 12.5 lbs. per hour of oil.

At condenser 227 the hot effluent gases are cooled from 215° F. to 100° F., a temperature below the dew point of the water and the oil. Removed from the effluent gases at the condenser and at entrainment separator 229 are 5,500 lbs. per hour of water, 5.5 lbs. per hour of oil and 3.5 lbs. per hour of dust.

Cooling water is circulated through the cooling tubes of condenser 227 at a rate of 350 gallons per minute. This water enters the condenser through line 225 at 80° F. and leaves through lines 224 at 120° F. Heat is removed from the hot effluent gases, at condenser 227, at about 6,800,000 BTU's per hour.

About 6,000 SCFM of cooled, partially decontaminated gas is introduced into electrostatic precipitator 232 through line 230 at a temperature of 100° F. This gas comprises 25,200 lbs. per hour of air, 1200 lbs. per hour of water, 2 lbs. per hour of dust and 7 lbs. per hour of oil.

About 6,000 SCFM of clean gas is removed from precipitator 232 through line 233 at a temperature of 100° F. The clean gas comprises 25,200 lbs. per hour of air, 1100 lbs. per hour of water, about 0.5 lbs. per hour of dust and about 1.5 lbs. per hour of oil. There is no visibly discernible plume.

Liquid drained from the bottom of precipitator 232 through line 237 comprises 100 lbs. per hour of water, 5.5 lbs. per hour of oil and 1.5 lbs. per hour of dust.

Condensing the water vapor from the gas at condenser 202 reduces substantially (e.g., by 25%) the volume of gas to be handled downstream of condenser 202 and thus reduces the size requirements of the gas-handling equipment downstream of condenser 202. Most of the condensed water is removed upstream of precipitator 232, and the condensed water removes with it the majority of the dust particles (over 70% in the example) and about 90% of the larger dust particles and close to half of the oil or smokey particulates (44% in the example).

Another factor which reduces the size of the equipment required to clean the gas is the provision of a recycling step for the hot effluent gases, upstream of condenser 227 (FIG. 2) or 127 (FIG. 1). Typically, one-half or more of the hot effluent gases are recycled to the heater, 40-60% being one permissible range. This leaves for treatment, downstream of the point where the hot effluent gases are divided, a volume of hot effluent gases only about one-half of that which leaves the spray drying tower.

It is important to cool the effluent gases to a temperature below 130° F. and preferably approaching 100° F. before they enter the electrostatic precipitator in order to remove there the oil or smokey particulates. At a temperature of 100° F., there is no visible plume of steam or other contaminants leaving the electrostatic precipitator. At a temperature of 110° F., the plume density (or obscurity) of the gas leaving the precipitator through line 233 is acceptable, the plume being essentially steam without other gaseous contaminants. However, about 130° F., the electrostatic precipitator is only partially effective in removing smoke (oil), and the plume density may be about the same as before electrostatic precipitation (e.g., 12-20%), a plume density which is generally unacceptably high.

The moisture content of the gases entering the precipitator should be greater than 20% by volume and preferably greater than 30%. This condition (moisture content greater than 20%) together with a temperature below 130° F. (preferably below 120° F.) provides efficient removal of contaminants from the gases at the electrostatic precipitator of FIG. 2 (as well as at the scrubber of FIG. 1). A high moisture content in the gases (e.g., 30% by volume) can produce an acceptable plume density at 130° F.

The electrostatic precipitator typically comprises a vertically disposed tube with a wire in the center. The contaminated gas enters at the bottom of the tube, and clean gas exits at the top of the tube.

A typical voltage gradient between the wire and the tube is 15,000 volts per inch which may be accomplished with a 2-inch tube and a voltage of 15,000 volts across the one inch space separating the central wire from the tube wall. Other tube diameters may be used, even conical tubes, so long as the voltage gradient is about 15,000 volts per inch for a constant diameter tube or averages that for a conical tube. A preferred range for the voltage gradient is 10,000-20,000 volts per inch.

The size and number of tubes depends upon the volume of gas to be cleaned by the precipitator. A tube 12 inches in diameter will handle about 1000 SCFM while a 2-inch tube will handle only about 20 SCFM and a 4-inch tube about 200-300 SCFM. If the gas volume entering the precipitator is 6,000 SCFM, six tubes each of 1000 SCFM capacity should be provided, or the like. Tube length is typically about 2-5 feet for a 2-inch tube and about 10 feet for 6-inch and 12-inch tubes.

The composition of the material removed from the gas by the electrostatic precipitator is generally about 1-2% dust, 5-10% oil and the balance water. This material drains from the walls of the tube by itself during normal operation of the precipitator.

As previously indicated, the precipitator may be preceded by a scrubber and cyclone separator, in lieu of a condenser and entrainment separator as shown in FIG. 2. The scrubber of FIG. 1 and the precipitator of FIG. 2 are desirably used in series, in that sequence.

The condenser 227 and the electrostatic precipitator 232 of FIG. 2 each remove contaminants from the effluent gases, but each removes a different fraction of the contaminants. For example, when cleaning effluent gases from a process making a detergent product having a pH of 10, the material collected at condenser 227 also has a pH of 10, and the material removed at the precipitator has a pH of 4 to 6.

The foregoing detailed description has been given for clearness of understanding only, and no unnecessary limitations should be understood therefrom, as modifications will be obvious to those skilled in the art.

What is claimed is:

1. In a method including spray drying material in a spray drying tower and then removing solid particulates and fumes from the hot effluent gases leaving said tower, wherein said tower receives a solids-containing, aqueous, liquid slurry and a heated gas stream for drying the solids contained in said slurry, the steps comprising:

discharging from said spray drying tower hot effluent gases containing steam and having a temperature above the dew point of said discharged gases;

dividing said discharged hot gases into a first portion and a second portion;

heating said first portion of the discharged hot gases to a temperature above the temperature of the solids-containing, aqueous, liquid slurry, and further above the dew point of said discharged gases, without cooling said first portion below its dew point between said dividing step and said heating step;

recycling said first portion to said spray drying tower as part of said heated gas stream, following said heating step, to increase the moisture content of said discharged gases;

contacting said solids-containing, aqueous, liquid slurry in said spray drying tower with said heated gas stream including said recycled, heated gases to dry said slurry with said heated gas stream;

subjecting said second portion of the discharged gases, having said increased moisture content resulting from said recycling step, to a condensing step by cooling said gases to agglomerate said solid particulates and fumes therein;

and then removing said agglomerated solid particulates and fumes from said cooled gases, without heating said second portion between said condensing and removing steps;

the moisture content of the discharged hot gases undergoing said condensing step being higher than the moisture content thereof absent said recycling step.

2. In a method as recited in claim 1 and comprising: conducting said hot gases discharged from said spray drying tower through a cyclone separator before dividing said gases into said first and second portions.

3. In a method as recited in claim 1 wherein said removing step comprises directly scrubbing said second portion of gases to remove contaminants from said gases.

4. In a method as recited in claim 3 wherein said scrubbing step produces a mixture of scrubbed gases and scrubbing solution, said method further comprising: subjecting said mixture to a separating step in a cyclone separator to separate said scrubbed gases from said scrubbing solution.

5. In a method as recited in claim 1 wherein: said removing step comprises subjecting said second portion of gases to an electrostatic precipitation step after said condensing step for removal of contaminants from said gases.

6. In a method as recited in claim 5 wherein said solids-containing, aqueous, liquid slurry received in said spray drying tower is detergent slurry from a detergent-making process involving sulfonation, and wherein:
said second portion of the discharged gases has a moisture content greater than 20% by volume;
said second portion of the discharged gases is cooled to a temperature in the range 100°–130° F. prior to said electrostatic precipitation step; and
the plume density of the gases following said electrostatic precipitation step being in the range 0–10%.

7. In a method as recited in claim 5 wherein: said condensing step comprises subjecting said second portion of gases to a scrubbing operation.

8. In a method as recited in claim 5 wherein said solids-containing, aqueous, liquid slurry received in said spray drying tower is detergent slurry from a detergent-making process involving sulfonation, and wherein:
said second portion of the discharged gases has a moisture content greater than 20% by volume;
said second portion of the discharged gases is cooled to a temperature in the range 100°–130° F. prior to said electrostatic precipitation step; and
the plume density of the gases following said electrostatic precipitation step being in the range 0–10%.

9. In a method as recited in claim 6 and comprising: subjecting said gases to an entrainment separating step between said condensing step and said electrostatic precipitation step to remove some of the contaminants from said gases before the electrostatic precipitation step.

10. In a method as recited in claim 1 wherein said first portion comprises the major portion.

11. In a method as recited in claim 1 wherein said heating step utilizes indirect heating.

12. In a method as recited in claim 1 wherein said heating step utilizes direct heating.

13. In a method as recited in claim 1 wherein: said first portion of discharged hot gases has a first temperature, above the dew point thereof, at the time said first portion is subjected to said heating step;
and said first portion has a second temperature substantially higher than said first temperature at the time it is recycled to said spray drying tower following said heating step.

14. In a method of spray drying material in a spray drying tower wherein said tower receives a solids-containing, aqueous, slurry and a heated gas stream containing air and stream for drying the solids contained in said slurry, and wherein hot gases containing solid particles, steam and other vaporous constituents are discharged from said tower, the steps comprising:
discharging said hot gases at a temperature above the dew point of said vaporous constituents;
dividing said discharged hot gases into a first portion and a second portion;
recycling said first portion of the discharged hot gases back to said spray drying tower to increase the moisture content of said discharged gases;
cooling the unrecycled second portion of said hot gases, having said increased moisture content due to said recycling step, to a temperature below the dew point of said vaporous constituents to reduce the volume of said gases and agglomerate said other vaporous constituents thereof;
and then subjecting said cooled gases to an electrostatic precipitation step to remove contaminants from said gases while said gases are at said cooled temperature.

15. In a method as recited in claim 14 wherein: said slurry is a detergent slurry made by a process in which organic reactants are sulfonated;
said slurry comprises a first unreacted organic reactant when the slurry enters said spray drying tower;
said heated gas stream has a temperature above 300° F. and up to about 1000° F. when the gas stream is received within said spray drying tower;
at least part of said unreacted organic reactant is converted, by said heated gas stream within said spray drying tower, to a second unreacted organic reactant having a lower dew point than said first unreacted organic reactant;
said other vaporous constituents, in the hot gases discharged from said tower, comprise unreacted organic reactants including at least said second unreacted organic reactant;
and said cooling step comprises cooling said hot gases to a cooled temperature below the dew point of said second unreacted organic reactant.

16. In a method as recited in claim 14 wherein: said slurry is a detergent slurry made by a process in which organic reactants are sulfonated;
said gases subjected to said electrostatic separation step are cooled to a temperature in the range 100°–130° F.;
and the moisture content of said gases as a result of said recycling step, is greater than 20% by volume.

17. In a method as recited in claim 14 wherein: said gases are subjected to a scrubbing step between said cooling step and said electrostatic precipitation step.

18. In a method as recited in claim 14 and comprising: condensing said vaporous constituents to liquid during said cooling step;
and removing, from said cooled gases, prior to said electrostatic precipitation step, a portion of the liquid condensed during said cooling step.

19. In a method as recited in claim 18 wherein: said removing step comprises passing said cooled gases through an entrainment separator after said condensing step and before said electrostatic precipitation step.

20. In a method as recited in claim 14 wherein:

said cooling step is conducted at least in part in a scrubber;

and said cooled gases are subjected to a separating step, in a cyclone separator, between said cooling step and said electrostatic precipitation step, to separate said cooled gases from the scrubbing solution.

21. In a method as recited in claim 20 wherein:

said cooling step comprises passing said hot gases through a heat exchanger immediately prior to said scrubber to cool at least some of said vaporous constituents below the dew point thereof.

22. In a method as recited in claim 14 wherein: said cooling and electrostatic precipitation steps are performed solely on said second portion of gases after said dividing step.

23. In a method as recited in claim 14 and comprising:

separating solid particles from said discharged hot gases, before said cooling step.

24. In a method as recited in claim 14 wherein:

the moisture content and the temperature of the gases subjected to said electrostatic precipitation step are controlled to provide said gases, following said electrostatic precipitation step, with a plume density in the range 0–10%.

* * * * *